(12) United States Patent
Satheesh et al.

(10) Patent No.: US 11,979,022 B2
(45) Date of Patent: May 7, 2024

(54) POWER QUALITY MONITORING IN A DISTRIBUTION GRID

(71) Applicant: Hitachi Energy Ltd, Zürich (CH)

(72) Inventors: Hariram Satheesh, Bengaluru (IN); Ravish Kumar, Bangalore (IN); Srijit Kumar, Bangalore (IN)

(73) Assignee: Hitachi Energy Ltd, Zürich (CH)

(*) Notice: Subject to any disclaimer, the term of this patent is extended or adjusted under 35 U.S.C. 154(b) by 334 days.

(21) Appl. No.: 17/418,448

(22) PCT Filed: Dec. 24, 2019

(86) PCT No.: PCT/IB2019/061325
§ 371 (c)(1),
(2) Date: Jun. 25, 2021

(87) PCT Pub. No.: WO2020/136576
PCT Pub. Date: Jul. 2, 2020

(65) Prior Publication Data
US 2023/0336023 A1 Oct. 19, 2023

(30) Foreign Application Priority Data
Dec. 28, 2018 (IN) .............................. 201841049522

(51) Int. Cl.
*H02J 13/00* (2006.01)
(52) U.S. Cl.
CPC .............................. *H02J 13/00002* (2020.01)
(58) Field of Classification Search
CPC ................. H02J 3/007; H02J 13/00002; H02J 13/00016; H02J 13/00028;
(Continued)

(56) References Cited

U.S. PATENT DOCUMENTS 8,849,715 B2* 9/2014 Forbes, Jr. ............. G06Q 40/00
705/39
9,134,353 B2* 9/2015 Jia .......................... G05B 15/02
(Continued)

FOREIGN PATENT DOCUMENTS

JP 2013093996 A 5/2013
JP 2013240145 A 11/2013
(Continued)

OTHER PUBLICATIONS

International Search Report and Written Opinion of the International Searching Authority, PCT/IB2019/061325, dated Mar. 3, 2020, 14 pages.
(Continued)

*Primary Examiner* — An H Do
(74) *Attorney, Agent, or Firm* — Sage Patent Group

(57) ABSTRACT

Example approaches for power quality monitoring in a power distribution grid are described. In an example, monitoring data is received by a communication gateway from a node coupled to it. In an example, there may be multiple nodes in the power distribution grid. Local insights for power quality monitoring may be estimated, based on the monitoring data, using predictive analytics at the communication gateway. The monitoring data and the local insights associated with each of the plurality of nodes is transmitted to the server. Global insights for power quality monitoring may be estimating, using predictive analytics performed at the server, based on the monitoring data and the local insights. An indication to an operator is generated, based on the estimated local insights, global insights and the monitored data, to carry out preventive or corrective action for maintaining the power quality in the power distribution grid.

9 Claims, 4 Drawing Sheets

(58) Field of Classification Search
CPC . H02J 13/00034; H02J 2203/20; Y04S 10/30; Y04S 40/124; Y04S 40/20; Y02E 60/00
See application file for complete search history.

(56) References Cited

U.S. PATENT DOCUMENTS

| | | |
|---|---|---|
| 11,381,090 B2 * | 7/2022 | Srinivasan .............. H02J 3/144 |
| 2008/0217471 A1 | 9/2008 | Liu et al. |
| 2010/0037189 A1 | 2/2010 | Bickel |
| 2010/0217550 A1 | 8/2010 | Crabtree et al. |
| 2012/0249092 A1 | 10/2012 | Krok et al. |
| 2014/0142774 A1 | 5/2014 | Katayama et al. |
| 2016/0118792 A1 | 4/2016 | Rosendahl |

FOREIGN PATENT DOCUMENTS

| | | | |
|---|---|---|---|
| JP | 2017034752 A | 2/2017 | |
| WO | 02084558 A1 | 10/2002 | |
| WO | 2016074073 A1 | 5/2016 | |

OTHER PUBLICATIONS

Indian Examination Report dated Apr. 7, 2021 for Indian Patent Application No. 201841049522, 6 pages.
First Japanese Office Action for Japanese Application No. 2021-537898 dated Oct. 5, 2022, 11 pages (including English translation).

* cited by examiner

POWER QUALITY MONITORING IN A DISTRIBUTION GRID

CROSS REFERENCE TO RELATED APPLICATIONS

This application is a 35 U.S.C. § 371 national stage application of PCT International Application No. PCT/IB2019/061325 filed on Dec. 24, 2019, which in turns claims foreign priority to Indian Patent Application No. 201841049522, filed on Dec. 28, 2018, the disclosures and content of which are incorporated by reference herein in their entirety.

TECHNICAL FIELD

The present invention relates, in general to monitoring of power quality in a distribution grid. More specifically, the present invention relates to monitoring, protection and control of energy storage elements in the distribution grid based on monitoring of behaviour of Automatic Power Factor Controller(s) and Intelligent Electronic Device(s) (IEDs) installed in the distribution grid.

BACKGROUND

Generally, a power distribution grid includes Automatic Power Factor Controller(s) (APFCs) and Intelligent Electronic Device(s) (IEDs) for monitoring and control of energy flow in the power distribution grid. The APFC and IED installations can be in a part of or spread across the entire power distribution grid, viz., one installation with every distribution transformer. Thus, in an example, there may be hundreds of APFC or IED installations under a power distribution grid. Each of the APFC or IED installations may be hereinafter referred to as a node. Thus, the power distribution grid may include a plurality of nodes. In an example, a node may represent a distribution substation.

Each of the nodes has a communication interface, such a communication interface communicating using Modbus protocol, to receive measured and calculated values of different parameters, such as current, voltage, power factor, switching transients, harmonic distortions, etc., in the power distribution grid. In addition to measured and calculated parameters, the communication interface may also provide logs and events from the APFCs and IEDs. Each of the nodes includes one or more energy banks and relays/circuit breakers to control charging and/or discharging of the energy banks. Each energy bank may include a plurality of energy storage elements, such as capacitor banks and/or inductors for controlling and monitoring power factor of the power distribution grid.

BRIEF DESCRIPTION OF DRAWINGS

The following detailed description references the drawings, wherein.

DETAILED DESCRIPTION

Figure 1:
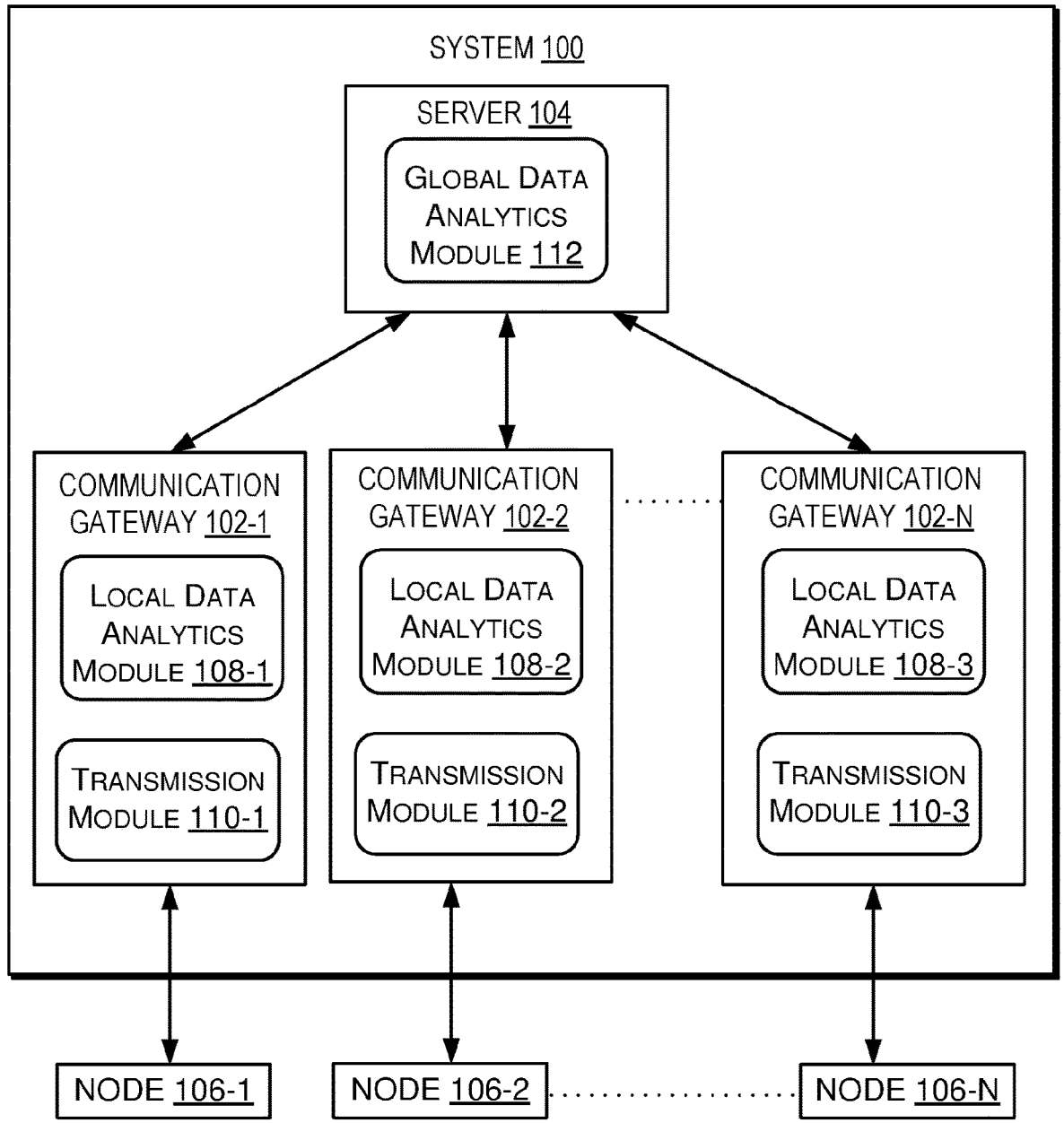
FIG. 1 illustrates a block diagram of a system for power quality monitoring in a power distribution grid, according to an example.

Conventionally, each of the nodes in the power distribution grid separately and individually monitor and control the switching (ON or OFF) of the capacitors and/or inductors in the energy banks based on local measurement of the parameters, such as current, voltage, power factor, switching transients, harmonic distortions, etc., at a particular node. Therefore, conventionally, power quality of the power distribution grid is monitored and controlled at a node level based on fluctuations/deviations of the parameters at each of the nodes. In an example, power quality may be indicated by power factor, tendency of occurrence of failures, harmonic disturbances, network losses, etc., in the power distribution grid.

In the power distribution grids, the electrical conditions and behavior at individual nodes may be affected by dynamics of the power distribution grid. For example, harmonic disturbance in one part of the power distribution grid may affect other locations or nodes of the power distribution grid. In another example, component failures in one or more APFCs at one or more nodes may have adverse effect on the overall power factor of the power distribution grid. Such dynamic changes and fluctuations at different locations of the power distribution grid are not accounted for during conventional monitoring of power quality at the power distribution grid at the node level based on fluctuations/deviations of the parameters separately and individually at each of the nodes.

The present subject matter enables monitoring of various APFCs/IEDs and other components at different nodes in a centralized manner. Such monitoring facilitates in identifying effects of fluctuations/deviations of electrical conditions locally at the node level on each APFC/IED individually, as well as, globally considering the entire power distribution grid, as a whole.

The present subject matter describes methods and systems for power quality monitoring in a power distribution grid. In an example, power quality may be indicated by power factor, tendency of occurrence of failures, harmonic disturbances, network losses, etc., in the power distribution grid. The power distribution grid includes a plurality of nodes, where each of the plurality of nodes comprises one of an APFC and an IED. A node may be understood as a point/section in a power distribution line where different electrical components are installed for monitoring and controlling of power quality in a power distribution grid. In an example, a node may represent an APFC/IED installation or a distribution substation. In an example, each of the plurality of nodes may be coupled to a corresponding communication gateway, from a plurality of communication gateways. A communication gateway includes a data communication device that enables flow of data between two distinct communication networks. Thus, the communication gateway may provide a remote network with connectivity to a host network. In an example, the communication gateway may be an edge device that functions as an entry point into an enterprise network or a service provider network. In the present subject matter, the plurality of communication gateways are coupled to a server. Alternatively, one or more of the APFCs or IEDs at the nodes may be communicatively coupled to the server via a network, such as the Internet. In an example, the server may be a substation server or may include a gateway server, an application server, and a database server which is a part of a Cloud infrastructure.

The communication gateway receives monitoring data from a corresponding node coupled to the communication gateway. The monitoring data is indicative of measured and calculated values of parameters, logs, and events generated at the node. The parameters may include operational parameters indicative of power quality in the power distribution grid. The logs include an account of readings/measurements of the operational parameters over a certain period of time. Events are indicative of fluctuations/deviations of the operational parameters from predefined thresholds for power quality management in the power distribution grid. In an example, the APFC or IED at the node may record measurements of different parameters and logs associated with power quality of the node and may transmit such data as monitoring data to be received by the communication gateway. In response to receiving the monitoring data, the communication gateway estimates local insights for power quality monitoring, using predictive analytics performed at the communication gateway. The local insights are indicative of health of electrical components at the node. In an example, the local insights include data associated with lifespan of the components and occurrence of faults in the components. Health of the electrical components is indicative of operational conditions of the electrical components and may be expressed in terms of percentage lifespan of a component, amount of degradation, frequency of occurrence of failures, inaccuracy in functioning, etc. Each of the communication gateways transmits the monitoring data and the local insights associated with each of the plurality of nodes to the server.

The server estimates global insights for power quality monitoring in the entire power distribution grid based on the monitoring data and the local insights using predictive analytics. The global insights are indicative of health of electrical components and power quality of the power distribution grid, as a whole. Thus, the estimation of the global insights enables the present systems and methods to take into account dynamic changes/fluctuations of electrical condition in any location of the power distribution grid and accordingly monitor and control the power quality at the point of fault. Further, the server may generate an indication to an operator, based on the determined local insights, global insights and the monitored data, to carry out preventive or corrective action for maintaining the power quality in the power distribution grid. In an example, the indication may be in the form of a distinctive format of text/highlighted text in which data associated with electrical conditions of the components at the node are displayed. In another example, the indication may be a sound alarm.

Since, in the present subject matter, power quality monitoring is performed based on the local insights at the node-level and also based on the global insights, considering the power grid, as a whole, therefore, various APFCs, IEDs, and other components are monitored in a centralized manner. Such monitoring may enable identification of effects of disturbances, faults, or events at each node individually, as well as, on the entire power distribution grid, as a whole. Thus, the present subject matter provides comprehensive and enhanced monitoring and control of power distribution grids. Further, based on the enhanced monitoring, power factor of the power distribution grids may be substantially improved.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a block diagram of a system 100 for power quality monitoring in a power distribution grid. In an example, the system 100 may be used for monitoring and controlling power factor in a power distribution grid. As shown in FIG. 1, the system 100 includes a plurality of communication gateways 102-1, 102-2, 102-3, . . . , 102-N, also referred to as communication gateways 102 in plural and communication gateway 102 in singular. The system 100 includes a server 104. In an example, the server 104 may be a substation server or a collection of a group of servers, such as an application server, a gateway server, and a database server. Each of the communication gateways 102 are communicatively coupled to the server 104 via a network, such as a private network or a public network, or the Internet.

Each of the communication gateways 102 are coupled to a corresponding node from a plurality of nodes 106-1, 106-2, . . . , 106-N, also referred to as nodes 106 in plural and node 106 in singular. Each of the plurality of nodes 106 include an APFC or an IED installed in a power distribution grid. In an example, each of the nodes may also include other electrical components, such as energy storage elements, current/voltage transformers, switches, circuit breakers, sensors, etc. As shown in FIG. 1, node 106-1 is coupled to communication gateway 102-1, node 106-2 is coupled to communication gateway 102-2, and node 106-N is coupled to communication gateway 102-N. Thus, each of the plurality of nodes 106 is coupled to a corresponding communication gateway, from the plurality of communication gateways 102. In an example, the communication gateway 102 may act as a remote monitoring device and may communicate with a control unit of an APFC of the node via Modbus Remote Terminal Unit (RTU) protocol or using Controller Area Network (CAN) bus protocol. A data communication between each of the nodes 106 and the corresponding communication gateways may be established through an ethernet connection or via a private network or the internet. Although in FIG. 1, each node is shown to be coupled to a corresponding communication gateway from the plurality of communication gateways, in an example, a node may also be directly coupled to the server 104.

Each of the communication gateways 102 have a processor (not shown in FIG. 1), a local data analytics module, and a transmission module. With reference to FIG. 1, the communication gateway 102-1 includes a local data analytics module 108-1 and a transmission module 110-1, the communication gateway 102-2 includes a local data analytics module 108-2 and a transmission module 110-2, and the communication gateway 102-3 includes a local data analytics module 108-3 and a transmission module 110-3. The local data analytics module(s) 108-1, 108-2, and 108-3 are collectively referred to as local data analytics module(s) 108 and the transmission module(s) 110-1, 110-2, and 110-3 are collectively referred to as transmission module 110. The local data analytics module 108 and the transmission module 110 may be implemented as either software installed within the communication gateway 102, or as hardware in the form of electronic circuitry. In an example, the local data analytics module 108 and the transmission module 110 may be coupled with the processor of the communication gateway 102. The server 104 includes a global data analytics module 112. The global data analytics module 112 may be implemented as either software installed within the server 104, or as hardware in the form of electronic circuitry. In an example, the global data analytics module 112 may be coupled with a processor of the server 104.

In an example, the nodes 106 include sensors (not shown) for measurements of different parameters. The sensors may be a current sensor, a voltage sensor, a temperature sensor, and soft sensors. The sensors may measure operating parameters of the power distribution grid (not shown). The operating parameters include voltage, current, rate of change of voltage, total harmonic distortion in the power distribution grid, harmonic spectrum up to $50^{th}$ order harmonics, power factor, type of energy storage elements in an APFC, temperature, switching transients, relay position in an APFC, etc. The sensors may transmit the data regarding the operating parameters to the communications gateways 102.

The description hereinafter is elaborated with reference to a single communication gateway 102-1, however, the same is applicable mutatis mutandis to each of the communication gateways 102 coupled to the server 104. In an example, the local data analytics module 108-1 receives monitoring data from the node 106-1. The monitoring data is indicative of measured and calculated values of parameters, logs, and events generated at the node 106-1. In an example, the monitoring data may include the data relating to the operating parameters, such as measurements and log reports of voltage, current, rate of change of voltage, total harmonic distortion in the power distribution grid, harmonic spectrum up to $50^{th}$ order harmonics, power factor, type of energy storage elements in an APFC, temperature, switching transients, relay position in an APFC received from the sensors in the node 106-1.

The local data analytics module 108-1 estimates local insights for power quality monitoring, using predictive analysis. The local insights are indicative of health of electrical components at the node. In an example, the local insights may include data associated with at least one of predicted lifespan of energy storage elements present in the node 106-1, component failure in the node 106-1, harmonic spectrum in the node 106-1, and predictive network loss and payback in the node 106-1. Similarly, local insights for node 106-2 to node 106-N may also be estimated by the corresponding communication gateway 102-2 to communication gateway 102-N.

The transmission module 110-1 is configured to transmit the monitoring data and the local insights associated with the node 106-1 to the server 104. Similarly, transmission modules 110-2 to 110-N transmit the monitoring data and the local insights associated with the nodes 106-2 to 106-N to the server 104. Thus, the monitoring data and the local insights associated with each of the plurality of nodes 106-1 to 106-N is transmitted to the server 104.

The global data analytics module 112 at the server 104 estimates global insights for power quality monitoring, based on the monitoring data and the local insights using predictive analytics. The global insights are indicative of health of electrical components and power quality of the power distribution grid. In an example, the global insights include data associated with predicted lifespan of energy storage elements present in the power distribution grid, component failure in the grid, harmonic spectrum distribution in the grid, and predictive network loss and payback in the grid. The global data analytics module 112 also generates an indication to an operator, based on the estimated local insights, global insights and the monitored data, to carry out preventive or corrective action for maintaining the power quality in the power distribution grid. In an example, the server 104 may transmit the global insights to the communication gateways 102-1 to 102-N, which can generate an indication to an operator to carry out preventive or corrective action. In an example, the global insights associated with predicted lifespan of energy banks of a particular node may be displayed at a display device coupled to the server 104. In another example, global insights associated with component failure at nodes in the grid may be displayed. In an example, reduced lifespan of an energy bank or component failures may be specifically identified or highlighted in the displayed global insights as an indication to the operator. In another example, a sound alarm may be generated as an indication. In an example, if the global data analytics module 112 generates an indication to the operator that an energy bank is subjected to substantial wear and tear or a contactor has undergone a failure, the operator may carry out a physical check or replace the capacitor bank and/or the contactor thereby preventing faults and improving power quality of the power distribution grid. These and other aspects are further described in conjunction with FIGS. 2 to 4.

Figure 2:
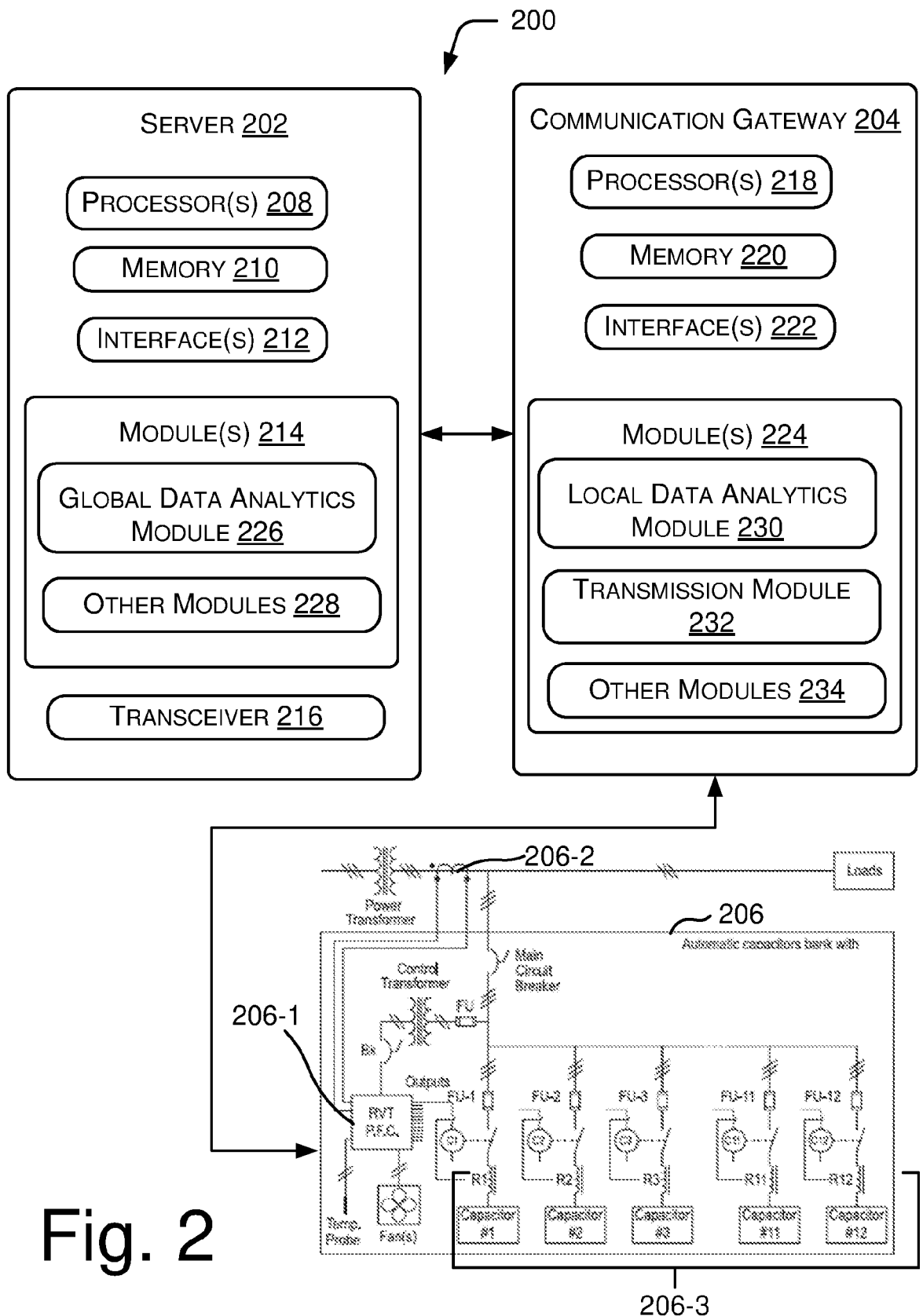
FIG. 2 illustrates another block diagram of a system for power quality monitoring in a power distribution grid, according to an example.

FIG. 2 illustrates a block diagram of a system 200 for power quality monitoring in a power distribution grid, according to an example. The system 200 includes a server 202 similar to the server 104, as shown in FIG. 1, and a communication gateway 204, similar to the communication gateway 102, as shown in FIG. 1. The communication gateway 204 is communicatively coupled to a node 206 similar to the node 106. Although FIG. 2 shows a single node coupled to a communication gateway, there may be multiple nodes and multiple communication gateways where each of the nodes are communicatively coupled to corresponding communication gateways.

The server 202 includes processor(s) 208 and a memory 210 coupled to the processor(s) 208. The server 202 further includes interface(s) 212, module(s) 214 and a transceiver 216. The communication gateway 204 includes processor(s) 218 and a memory 220 coupled to the processor(s) 218. The communication gateway 204 further includes interface(s) 222, and module(s) 224.

The processor(s) 208 and 218 may be a single processing unit or a number of units, all of which could include multiple computing units. The processor(s) 208 and 218 may be implemented as one or more microprocessor, microcomputers, digital signal processors, central processing units, state machines, logic circuitries, and/or any devices that manipulate signals based on operational instructions. Among other capabilities the processor(s) 208 and 218 are adapted to fetch and execute processor-readable instructions stored in the memories 210 and 220, respectively, to implement one or more functionalities. In an example, the server 202 may be a cloud server having processing capabilities distributed over different clusters of the cloud server.

The memories 210 and 220 may be coupled to the processor(s) 208 and 218, respectively. The memories 210 and 220 may include any computer-readable medium known in the art including, for example, volatile memory, such as Static Random-Access Memory (SRAM) and Dynamic Random-Access Memory (DRAM), and/or non-volatile memory, such as Read Only Memory (ROM), Erasable Programmable ROMs (EPROMs), flash memories, hard disks, optical disks, and magnetic tapes. In an example, the server 202 may be a cloud server having data storage capabilities distributed over different storage devices or databases of a cloud network which are accessible by the cloud server.

The interface(s) 212 and 222 may include a variety of software and hardware enabled interfaces. The interface(s) 212 may enable the communication and connectivity between the server 202 and other components of the network, such as a remote monitoring device (not shown). The interface(s) 222 may enable the communication and connectivity between the communication gateway 204 and other components of the network, such as a remote monitoring device (not shown). The interface(s) 212 and 222 may facilitate multiple communications within a wide variety of protocols and may also enable communication with one or more computer enabled terminals or similar network components.

The module(s) 214 and 224 may be implemented as a combination of hardware and programming (for example, programmable instructions) to implement a variety of functionalities of the module(s) 214 and 224. In examples described herein, such combinations of hardware and programming may be implemented in several different ways. For example, the programming for the module(s) 214 and 224 may be executable instructions. Such instructions may be stored on a non-transitory machine-readable storage medium which may be coupled either directly with the server or the communication gateway directly or indirectly (for example, through networked means). In case implemented as a hardware, the module(s) 214 and 224 may include a processing resource (for example, either a single processor or a combination of multiple processors), to execute such instructions. In the present examples, the processor-readable storage medium may store instructions that, when executed by the processing resource, implement module(s) 214 and 224. In other examples, module(s) 214 and 224 may be implemented by electronic circuitry.

In an example, the module(s) 214 include a global data analytics module(s) 226 for determining global insights associated with power quality management in the power distribution grid. In addition, the module(s) 214 may further include other module(s) 228. The other module(s) 228 may implement functionalities that supplement applications or functions performed by the server 202 or any of the module(s) 214.

In an example, the module(s) 224 include a local data analytics module(s) 230 for determining local insights associated with power quality management in the power distribution grid. In addition, the module(s) 224 further include a transmission module 232 and other modules 234. The transmission module 232 may enable data communication between the communication gateway 204 and the server 202. The other module(s) 234 may implement functionalities that supplement applications or functions performed by the communication gateway 204 or any of the module(s) 224.

The node 206, as illustrated in FIG. 2, illustrates an APFC installation in the power distribution grid. The node 206 includes a controller 206-1. The controller 206-1 may enable measurement and storing of operating parameters of the power distribution grid, such as current, voltage, power factor, switching transients, harmonic distortions, etc. The controller 206-1 may record data indicative of measured and calculated values of parameters, logs, and events generated at the node 206. As shown in FIG. 2, the controller 206-1 is coupled to a distribution transformer 206-2 for measurement of the parameters. Further, based on the measurements of the parameters, the controller 206-1 can control charging/discharging of an energy bank 206-3 of the node 206. In an example, the controller 206-1 may be an APFC. As can be seen from FIG. 2, the energy bank 206-3 includes energy storage elements, such as capacitors and inductors.

In operation, the communication gateway 204 receives monitoring data from the node 206. The monitoring data is indicative of measured and calculated values of parameters, logs, and events generated at the node 206. In an example, the monitoring data may be received by the local data analytics module 230 from an APFC, such as the controller 206-1.

The local data analytics module 230 estimates local insights for power quality monitoring. The local insights are indicative of health of electrical components at the node 206. Health of the electrical components is indicative of operational conditions of the electrical components and may be expressed in terms of percentage lifespan of a component, amount of degradation, frequency of occurrence of failures, inaccuracy in functioning, etc. In an example, the local data analytics module 230 estimates local insights associated with lifespan of the energy bank 206-3 at the node 206 using a predictive analytical model. In an example, the rated Kilo Volt Ampere Reactive (KVAR) value of the energy bank 206-3 is denoted as $CB_{KVAR}$. In the operational phase, the energy bank 106-3 shall provide rated capacitance when it is activated and connected to load.

The local data analytics module 230 calculates an apparent power of the energy bank 206-3 based on the monitoring data associated with power factor, current, and voltage obtained from the APFC or the controller 206-1, when the energy bank 206-3 is in an OFF state. In an example the apparent power may be calculated according to equation 1 below.

$$P_t = V_t * I_t * PF_t \tag{1}$$

where $P_t$ represents the apparent power at the time instant "t", $V_t$ represents the voltage at the time instant "t", It represents the current at the time instant "t", and $PF_t$ represents the power factor at the time instant "t". The measurements of $P_t$, $V_t$, $I_t$, and $PF_t$ correspond to measurements of the energy bank 206-3 during an OFF state of the energy bank 206-3.

In an example, the local data analytics module 230 may obtain the voltage, current, and power factor readings of the energy bank 206-3 during the ON state of the energy bank 206-3 from the controller 206-1. Thus, $P_{t+tON}$ represents the apparent power, $V_{t+tON}$ represents the voltage, and $PF_{t+tON}$ represents the power factor, when the energy bank is in an ON state. The local data analytics module 230 may calculate the KVAR of the energy bank 206-3 based on equations 2 and 3, as below.

$$\theta_t = \cos^{-1}(PF_t) \tag{2}$$

$$\theta_{t+tON} = \cos^{-1}(PF_{t+tON}) \tag{3}$$

where $\theta_t$ represents the KVAR of the energy bank 206-3 in the OFF state and $\theta_{t+ON}$ represents the KVAR of the energy bank 206-3 in the ON state. In an example, the KVAR of the energy bank in an OFF state and in an ON state may be calculated by the controller 206-1 and the calculated KVARs may be received by the local data analytics module 230 at the communication gateway 204.

The local data analytics module 230 calculates an effective KVAR rating for the energy bank 206-3 based on the apparent power $P_t$ and monitoring data associated with the power factor, current, and voltage obtained from the controller 206-1, when the energy bank is in an ON state. In an example, the effective KVAR may be calculated as shown in equation (4).

$$E_{KVAR}=P_t*(\tan(\theta_{t+tON})-\tan(\theta_t)) \quad (4)$$

Where $E_{KVAR}$ denotes effective KVAR for the energy bank 206-3.

The local data analytics module 230 further calculates a difference between the effective KVAR rating for the energy bank 206-3 and a predefined KVAR rating. In an example, the predefined KVAR rating is the rated KVAR denoted as $CB_{KVAR}$. Thus, the difference between the effective KVAR and the predefined KVAR may be expressed as follows in equation 5.

$$\Delta_{PF_n}=E_{KVAR_n}-CB_{KVAR_n} \quad (5)$$

Where $\Delta_{PF_n}$ denotes the difference between the effective KVAR and the rated KVAR.

The local data analytics module 230 further calculates an average of the difference between the effective energy bank rating and the predefined energy bank rating over a plurality of samples, as denoted through equation (6).

$$\Delta_{PF} = \frac{\sum_{n=1}^{n=max} \Delta PF_n}{n} \quad (6)$$

Where $\Delta_{PF}$ denotes the average of the difference between the effective energy bank rating and the predefined energy bank over "n" number of samples.

The local data analytics module 230 further calculates a degradation factor of the energy bank 206-3, based on the average of the difference and the predefined energy bank rating, for example, the rated KVAR of the energy bank 206-3. In an example, the degradation factor of the energy bank 206-3 may be calculated as denoted in equation (7) below.

$$D_F = 1 - \frac{CB_{KVAR} - \Delta_{PF}}{CB_{KVAR}} \quad (7)$$

In another example, the local data analytics module 230 determines an activation response time of the energy bank 206-3 based on a time period between activation of a relay and improvement in the power factor of the energy bank 206-3. The local data analytics module 230 may calculate the degradation factor based on the activation response time and then predict the lifespan of the energy bank 206-3 using machine learning models.

Lower value of $D_F$ indicates better energy bank performance. A higher value of $D_F$ indicates a reduced energy bank performance. Further, $D_F$ can be used to derive remaining life of capacitor bank as below. In an example, the local data analytics module 230 in the communication gateway 204 predicts the life span of the energy bank based on the degradation factor and a predefined coefficient based on the equation 8 enumerated below.

$$\text{Energy bank life span (LS)}=D_F*K \quad (8)$$

Where K is the estimated life span factor. In an example, the estimated life span factor may be predefined in the local data analytics module 230. Thus, the communication gateway 204 estimates local insights associated with lifespan of the energy bank 206-3 based on the monitoring data received from the node 206. Similarly, communication gateways, such as the communication gateways 102-1 to 102-N, can also estimate the local insights associated with lifespans of energy banks of corresponding nodes, such as nodes 106-1 to 106-N, to which they are connected, for power quality monitoring.

In another example, the local data analytics module 230 of the communication gateway 204 estimates local insights associated with component failure in the controller 206-1 of the node 206. In an example, the controller 206-1 may be an APFC. The local data analytics module 230 monitors deviation of a power factor of the node 206 from a predefined threshold. In response to the monitored deviation of the power factor of the node 206 from the predefined threshold, the local data analytics module 230 continuously generates a log report including monitoring data associated with power factor, controller's 206-1 relay position, and corresponding time instants.

Further, the local data analytics module 230 monitors a time interval in which the power factor for the controller 206-1 is improved after the relay in the node 206 is activated, in response to a deviation of the power factor from the predefined threshold. The local data analytics module 230 identifies a number of instances when the time interval in which the power factor for the node 206 is improved is greater that a predefined time interval. In an example, the predefined time interval is 50 seconds. Based on the monitored deviation of the power factor, the log report, and the number of instances, the local data analytics module 230 predicts occurrence of a failure in an electrical component, such as a contactor, a fuse, and a capacitor in the node 206. In an example, if the number of instances when the time interval in which the power factor for the node 206 is improved is greater that the predefined time interval, exceeds a certain threshold, it may be indicative of a degradation in the energy bank's 206-3 performance or of a fault in contactor or fuse of the node 206. Similarly, communication gateways, such as the communication gateways 102-1 to 102-N, can also estimate the local insights associated with component failure in controllers of corresponding nodes, such as nodes 106-1 to 106-N, to which they are connected, for power quality monitoring.

In another example, the local data analytics module 230 of the communication gateway 204 estimates local insights associated with harmonic spectrum of the node 206. In an example, the local data analytics module 230 predicts harmonic pollution in the node 206, based on monitoring data associated with voltage, current, total harmonic distortion, power factor, higher order harmonics, and lower order harmonics in the node 206. In an example, the local insights associated with harmonic spectrum of the node 206 may be estimated using machine learning techniques. Similarly, communication gateways, such as the communication gateways 102-1 to 102-N, can also estimate the local insights associated with harmonic spectrum of corresponding nodes, such as nodes 106-1 to 106-N, to which they are connected, for power quality monitoring.

In another example, the local data analytics module 230 of the communication gateway 204 estimates local insights associated with predictive network loss and payback at the node 206. Predictive network loss refers to loss of electrical power in the power distribution gird due to occurrence of faults in the network. Predictive Payback refers to a predicted value of lost tariffs for a power distribution company due to network losses in the power distribution grid. Similarly, communication gateways, such as the communication gateways 102-1 to 102-N, can also estimate the local insights associated with predictive network loss and payback at corresponding nodes, such as nodes 106-1 to 106-N, to which they are connected, for power quality monitoring.

In response to the local insights associated with power quality monitoring being estimated by the local data analytics module 230, the transmission module 232 of the communication gateway 204 transmits the monitoring data and the local insights associated with the node 206 to the server 202. Similarly, transmission modules (not shown) of each of the plurality of communication gateways, such as the communication gateways 102-1 to 102-N, can transmit the local insights associated with power quality monitoring of each of corresponding nodes, such as nodes 106-1 to 106-N, to which they are connected, to the server 104 or 204.

In an example, the global data analytics module 226 at the server 202 estimates global insights for power quality monitoring, based on the monitoring data and the local insights. The global insights are indicative of health of electrical components and power quality of the power distribution grid.

In an example, in response to receiving the local insights associated with the predicted lifespan of the energy banks of the nodes, such as the nodes 106-1 to 106-N, the global data analytics module 226 validates the predicted lifespan of the energy banks. In an example, several estimated values of the lifespan of the energy bank 206-3 may be received by the server 202 from the local insights. The global data analytics module 226 may apply predictive analytics using machine learning techniques on the several estimated values to validate the predicted lifespan of the energy bank 206-3, using the monitored data and the local insights. Thus, a global insight associated with the lifespan of the energy bank 206-3 may be estimated by the global data analytics module at the server 202. Similarly, a global insight associated with the lifespan of the energy banks at other nodes, such as nodes 106-1 to 106-N, may also be estimated by the global data analytics module 226.

In another example, in response to receiving the local insights associated with the predicted occurrence of the failure in one of the components in the nodes, such as the nodes 106-1 to 106-N, the global data analytics module 226 validates the predicted occurrence of the failure at those nodes. In an example, several estimated local insights associated with component failure in the node 206 may be received by the server 202. The global data analytics module 226 may apply predictive analytics using machine learning techniques on the several estimated local insights to validate the local insights associated with component failure in the node 206, using the monitored data and the local insights. Thus, global insights associated with component failure in the nodes, such as the nodes 106-1 to 106-N, may be estimated by the global data analytics module 226 at the server 202.

In another example, in response to receiving the local insights associated with harmonic spectrum of the nodes, such as the nodes 106-1 to 106-N, the global data analytics module 226 predicts a harmonic spectrum of the power distribution grid as a whole, based on the monitoring data and local insights associated with harmonic spectrum in each of the plurality of nodes, such as the nodes 106-1 to 106-N. Further, the global data analytics module 226 may estimate occurrence of harmonic resonance in the power distribution grid, based on the monitoring data and predicted harmonic pollution for the plurality of nodes, such as the nodes 106-1 to 107-N, in the power distribution grid. In an example, the global data analytics module 226 may use machine learning techniques for estimation of occurrence of the harmonic resonance.

In another example, in response to receiving the local insights associated with predictive network loss and payback of the nodes, such as the nodes 106-1 to 106-N, the global data analytics module 226 may estimate predictive network loss and payback of the power distribution grid based on the monitoring data and local insights associated with predictive network loss and payback of each of the nodes, such as the nodes 106-1 to 106-N.

In response to estimation of the local and global insights, the server 202 generates an indication to an operator, based on the estimated local insights, global insights and the monitored data, to carry out preventive or corrective action for maintaining the power quality in the power distribution grid. In an example, the interfaces 212 of the server 202 may include a display (not shown) which can generate a visual message to the operator, in response to an estimation of global insights indicating that the lifespan of an energy bank, such as the energy bank 206-3, is below a threshold lifespan. In another example, a sound alarm may be generated by the interfaces 212. The visual message and the alarm is indicative of preventive or corrective action to be performed by the operator at the energy bank, such as energy bank 206-3. In an example, the preventive or corrective action may be one of checking the energy bank for faults and replacing the energy bank.

In another example, the interfaces 212 may generate a visual message or a sound alarm to the operator, in response to estimation of global insights indicating that a contactor or fuse at one of the nodes, among the nodes 106-1 to 106-N, is subjected to a failure. The visual message and the sound alarm is indicative of preventive or corrective action to be performed by the operator. In an example, the preventive or corrective action may be one of checking the contactor or fuse for faults and replacing the contactor or fuse.

Figure 3:
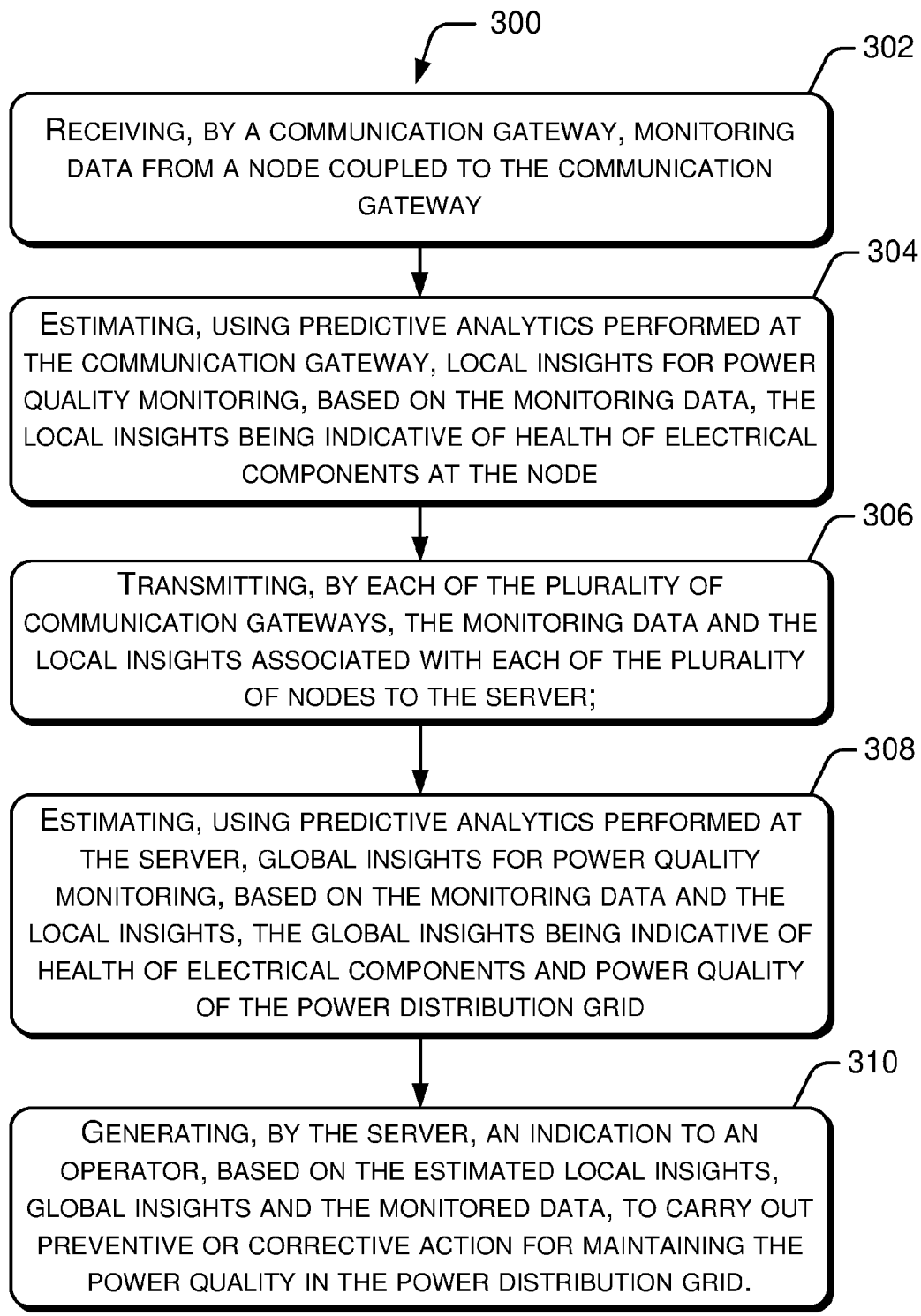
FIG. 3 illustrates a method for power quality monitoring in a power distribution grid, according to an example.

FIG. 3 illustrates a method 300 for power quality monitoring in a power distribution grid, according to an example. The power distribution grid includes a plurality of nodes, such as the nodes 106-1 to 106-N. Each of the plurality of nodes includes one of an automatic power factor controller (APFC) and an Intelligent electronic device (IED). Each of the plurality of nodes, such as nodes 106-1 to 106-N, are coupled to a corresponding communication gateway, from a plurality of communication gateways, such as communication gateways 102-1 to 102-N. The plurality of communication gateways are coupled to a server, such as server 104 or 202. The method 300 may be executed by a system, such as the system 100 or 200. The system includes the server and the communication gateways. The method 300 can be implemented by processing resource(s) or electrical control systems through any suitable hardware, programmable instructions, or combination thereof. In an example, step(s) of the method 300 may be performed by hardware or programming modules, such as the local data analytics module 108 or 230, the transmission module 110 or 232, and global data analytics module 112 or 226. In the following description of the method 300, if an operation is said to be performed/carried out/executed by a module of a device, the operation may be understood to be performed/carried out/executed by the device itself. Thus, if an operation is said to be performed/carried out/executed by a module of a communication gateway, it may be understood that the operation may be performed/carried out/executed by the communication gateway itself. Similarly, if an operation is said to be performed/carried out/executed by a module of a server, it may be understood that the operation may be performed/carried out/executed by the server itself. Further, although the method 300 is described in context of the aforementioned system 100 or 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a communication gateway, such as the communication gateway 204, receives monitoring data from a node, such as the node 206, coupled to the communication gateway. The monitoring data is indicative of measured and calculated values of parameters, logs, and events generated at the node. In an example, the monitoring data may include the data relating to the operating parameters, such as measurements and log reports of voltage, current, rate of change of voltage, total harmonic distortion in the power distribution grid, harmonic spectrum up to $50^{th}$ order harmonics, power factor, type of energy storage elements in an APFC at the node, temperature, switching transients, relay position in the APFC.

At block 304, local insights for power quality monitoring, is estimated by a communication gateway, such as by the local data analytics module 230 of the communication gateway 204, based on the monitoring data. The local insights are indicative of health of electrical components at the node. The estimate is done using predictive analytics performed at the communication gateway. In an example, the local insights include data associated with lifespan of the components and occurrence of faults in the components. Health of the electrical components is indicative of operational conditions of the electrical components and may be expressed in terms of percentage lifespan of a component, amount of degradation, frequency of occurrence of failures, inaccuracy in functioning, etc.

In an example, local insights associated with lifespan of an energy bank, such as the energy bank 206-3 may be estimated. For estimation of the lifespan of the energy bank 206-3, the monitoring data is received by the communication gateway, such as the communication gateway 204, from the node 206. In an example, the monitoring data may be received from the controller 206-1 of the node 206. In an example, the controller 206-1 may be an APFC. The method for estimation of local insights associated with estimation of lifespan of the energy bank is explained later in the description in conjunction to FIG. 4.

In another example, the communication gateway can estimate local insights associated with component failure in a node, such as in a controller or APFC of the node. In the example, the monitoring data is received from the controller or APFC. The communication gateway or a module, such as the local data analytics module 230, of the communication gateway, such as the communication gateway 204, monitors deviation of a power factor of the controller or APFC of the node from a predefined threshold. A log report including monitoring data associated with power factor, APFC Controller's relay position, and corresponding time instants is continuously generating in response to the monitored deviation of the power factor of the APFC from the predefined threshold. A time interval in which the power factor for the APFC is improved after the relay in the APFC is activated in response to a deviation of the power factor from the predefined threshold is monitored. A number of instances when the time interval in which the power factor for the APFC is improved is greater that a predefined time interval is identified. Based on the monitored deviation of the power factor, the log report, and the number of instances occurrence of a failure in one of a contactor, a fuse, and a capacitor in a controller, such as the controller 206-1 or an APFC, of a node, such as the node 206, is predicted.

In another example, the communication gateway can estimate local insights associated with harmonic spectrum at a particular node. In the example, harmonic pollution in the controller or APFC is predicted, based on monitoring data associated with voltage, current, total harmonic distortion, power factor, higher order harmonics, and lower order harmonics in the APFC or controller, such as the controller 206-1 at the node 206. In another example, the communication gateway can estimate local insights associated with predictive network loss and payback at a particular node from a plurality of nodes, such as the nodes 106-1 to 106-N, in the power distribution grid.

At block 306, in response to estimation of the local insights for power quality monitoring, the monitoring data and the local insights associated with each of the plurality of nodes are transmitted by the communication gateway, such as by the transmission module 232 of the communication gateway 204, to the server, such as the server 202. In an example, local insights associated with each of the nodes 106-1 to 106-N are transmitted to the server 104.

At block 308, global insights for power quality monitoring are estimated, based on the monitoring data and the local insights. The global insights are estimated using predictive analytics performed at the server, such as at the global data analytics module 112 or 226 at the server 104 or 202. The global insights are indicative of health of electrical components and power quality of the power distribution grid.

In an example, the server can estimate global insights associated with predicted lifespan of an energy bank in the power distribution grid. The predicted lifespan of the energy bank associated with the local insights may be validated at the server, based on predictive analytics performed at the server using the monitored data and the local insights. In an example, machine learning techniques may be used for validation of the predicted lifespan of the energy bank from multiple samples of predicted lifespans obtained from the local insights.

In another example, the server can estimate global insights associated with predicted occurrence of failure in electrical components in the power distribution grid. In an example, the electrical components include one of a contactor, a fuse, an, energy bank, and a capacitor installed in a node or a controller such as an APFC of the node. The predicted occurrence of failure in electrical components associated with the local insights may be validated at the server, based on predictive analytics performed at the server using the monitored data and the local insights. In an example, machine learning techniques may be used for validation of local insights associated with predicted occurrence of failure in electrical components from multiple samples obtained from the local insights. Using the monitoring data and the local insights global insights may be predicted from the samples.

In another example, the server can estimate global insights associated with harmonic spectrum in the power distribution grid. In an example, in response to receiving the local insights associated with harmonic spectrum of the nodes, such as the nodes 106-1 to 106-N, a harmonic spectrum of the power distribution grid as a whole may be predicted, based on the monitoring data and local insights associated with harmonic spectrum in each of the plurality of nodes, such as the nodes 106-1 to 106-N. Further, occurrence of harmonic resonance in the power distribution grid may be estimated, based on the monitoring data and predicted local insights associated with harmonic pollution for each of the plurality of controllers/APFCs at the plurality of nodes in the power distribution grid.

In another example, the server can estimate global insights associated with predictive network loss and payback in the power distribution grid. In the example, the monitoring data and local insights associated with predictive network loss and payback from each of the plurality of APFCs/controllers at the plurality of nodes are received. Based on the monitoring data and local insights associated with predictive network loss and payback at each of the plurality of APFCs, predictive network loss and payback of the power distribution grid may be estimated using predictive analytics and machine learning techniques.

At block 310, in response to the global insights for power quality monitoring being estimated, an indication to an operator is generated, based on the estimated local insights, global insights and the monitored data. The indication intimates/notifies the operator to carry out preventive or corrective action for maintaining the power quality in the power distribution grid. In an example, one of a visual message and an alarm is generated to the operator, in response to determining that the lifespan of an energy bank, such as the energy bank 206-3, is below a threshold lifespan. The visual message and the alarm is indicative of preventive or corrective action to be performed by the operator at the energy bank. The preventive or corrective action includes carrying out maintenance activity at the energy bank or replacing the energy bank.

Figure 4:
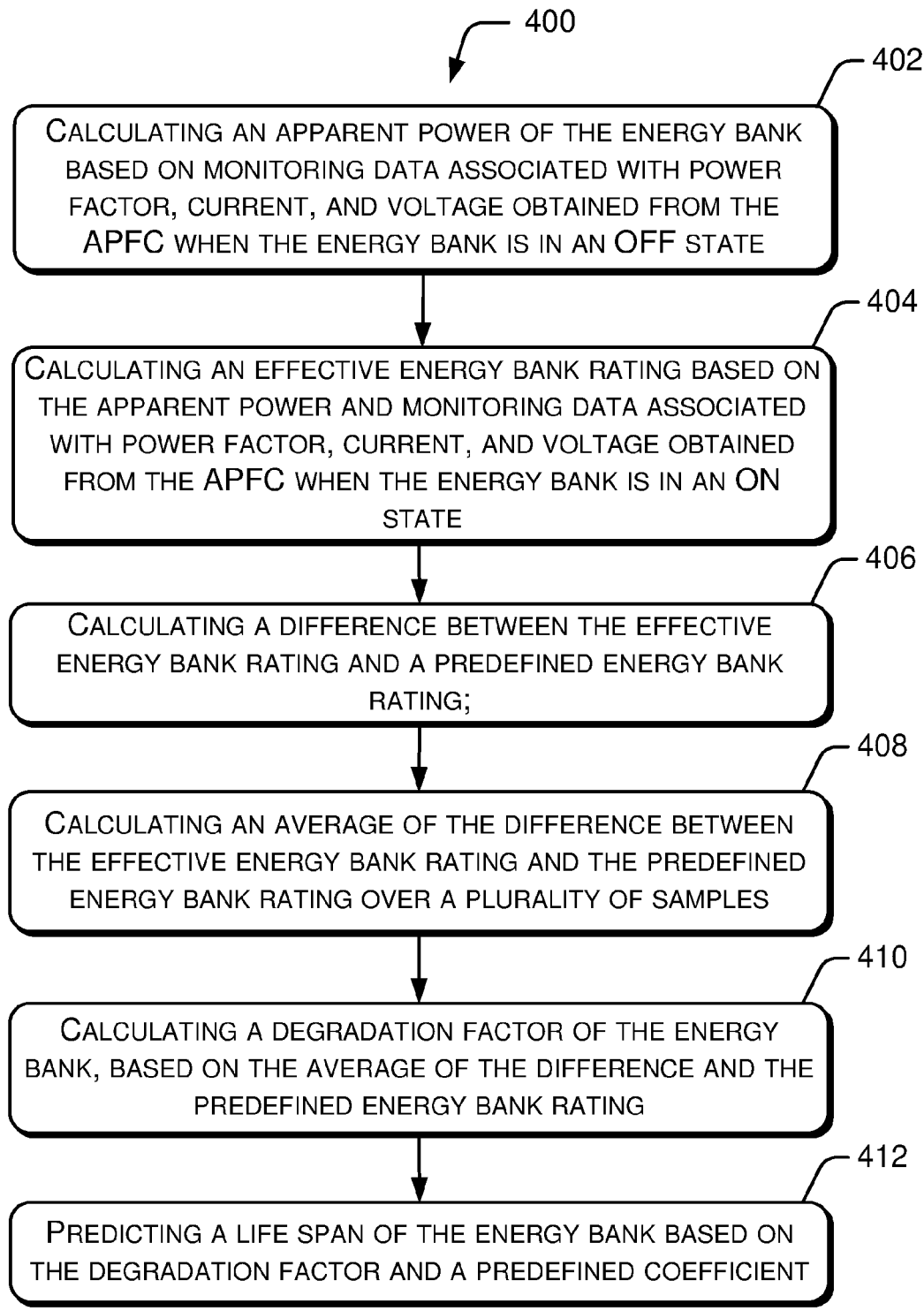
FIG. 4 illustrates a method for estimation of local insights associated with lifespan of an energy bank, according to an example.

FIG. 4 illustrates a method 400 for estimation of local insights associated with lifespan of an energy bank, according to an example. The power distribution grid includes a plurality of nodes, such as the nodes 106-1 to 106-N. Each of the plurality of nodes includes one of an automatic power factor controller (APFC) and an Intelligent electronic device (IED). Each of the plurality of nodes, such as nodes 106-1 to 106-N, are coupled to a corresponding communication gateway, from a plurality of communication gateways, such as communication gateways 102-1 to 102-N. The plurality of communication gateways is coupled to a server, such as the server 104 or 202. The method 400 may be executed by a system, such as the system 100 or 200. The system includes the server and the communication gateways. The method 400 can be implemented by processing resource(s) or electrical control systems through any suitable hardware, programmable instructions, or combination thereof. In an example, step(s) of the method 400 may be performed by hardware or programming modules, such as the local data analytics module 108 or 230, of the communication gateway 102 or 204. In the following description of the method 400, if an operation is said to be performed/carried out/executed by a module of a device, the operation may be understood to be performed/carried out/executed by the device itself. Thus, if an operation is said to be performed/carried out/executed by a module of a communication gateway, it may be understood that the operation may be performed/carried out/executed by the communication gateway itself. Further, although the method 400 is described in context of the aforementioned system 100 or 200, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 4, at block 402, an apparent power of the energy bank, such as the energy bank 206-3, is calculated based on monitoring data associated with power factor, current, and voltage obtained from the controller, such as the controller 206-1, or the APFC when the energy bank is in an OFF state.

At block 404, an effective energy bank rating is calculated based on the apparent power and monitoring data associated with power factor, current, and voltage obtained from the APFC when the energy bank is in an ON state.

At block 406, a difference between the effective energy bank rating and a predefined energy bank rating is calculated. In an example, the effective energy bank rating may correspond to a Kilo Volt Ampere reactive (KVAR) rating of the energy bank calculated based on the operational parameters, such as power factor, current, and voltage and the predefined energy bank rating may correspond to the rated KVAR of the energy bank as specified in the specifications of the energy bank. In an example, a plurality of values of the effective KVAR or effective energy bank rating is calculated based on which a plurality of samples of the difference between the effective energy bank rating and the predefined energy bank rating is calculated.

At block 408, an average of the difference between the effective energy bank rating and the predefined energy bank rating over a plurality of samples is calculated. At block 410, a degradation factor of the energy bank is calculated based on the average of the difference and the predefined energy bank rating. At block 412, a lifespan of the energy bank is calculated based on the degradation factor and a predefined coefficient.

We claim:

1. A method for power quality monitoring in a power distribution grid, wherein the power distribution grid includes a plurality of nodes, wherein each of the plurality of nodes comprises one of an automatic power factor controller (APFC) and an Intelligent electronic device (IED), each of the plurality of nodes being coupled to a corresponding communication gateway from a plurality of communication gateways, the plurality of communication gateways being coupled to a server, the method comprising:

receiving, by a communication gateway, monitoring data from a node coupled to the communication gateway, wherein the monitoring data is indicative of measured and calculated values of parameters, logs, and events generated at the node, wherein the monitoring data is received from the APFC;

estimating, using predictive analytics performed at the communication gateway, local insights for power quality monitoring, based on the monitoring data, the local insights being indicative of health of electrical components at the node, wherein estimating the local insights comprises estimating the local insights associated with harmonic spectrum, wherein estimating the local insights associated with the harmonic spectrum comprises predicting, by the communication gateway, harmonic pollution in the APFC, based on the monitoring data associated with voltage, current, total harmonic distortion, power factor, higher order harmonics, and lower order harmonics in the APFC;

transmitting, by each of the plurality of communication gateways, the monitoring data and the local insights associated with each of the plurality of nodes to the server;

estimating, using predictive analytics performed at the server, global insights for power quality monitoring, based on the monitoring data and the local insights, the global insights being indicative of health of electrical components and power quality of the power distribution grid; and generating, by the server, an indication to an operator, based on the estimated local insights, global insights and the monitoring data, to carry out preventive or corrective action for maintaining the power quality in the power distribution grid.

2. The method as claimed in claim 1, wherein the monitoring data is received from the APFC, the APFC comprising an energy bank having a plurality of energy storage elements, wherein estimating local insights associated with lifespan of the energy bank comprises:

calculating, by the communication gateway, an apparent power of the energy bank based on monitoring data associated with power factor, current, and voltage obtained from the APFC when the energy bank is in an OFF state;

calculating, by the communication gateway, an effective energy bank rating based on the apparent power and monitoring data associated with power factor, current, and voltage obtained from the APFC when the energy bank is in an ON state;

calculating, by the communication gateway, a difference between the effective energy bank rating and a predefined energy bank rating;

calculating, by the communication gateway, an average of the difference between the effective energy bank rating and the predefined energy bank rating over a plurality of samples;

calculating, by the communication gateway, a degradation factor of the energy bank, based on the average of the difference and the predefined energy bank rating; and predicting, by the communication gateway, the life span of the energy bank based on the degradation factor and a predefined coefficient.

3. The method as claimed in claim 2, wherein estimating the global insights comprises:

validating the predicted lifespan of the energy bank associated with the local insights, based on predictive analytics performed at the server using the monitoring data and the local insights.

4. The method as claimed in claim 3, wherein generating indication to the operator comprises:

generating one of a visual message and an alarm to the operator, in response to determining that the lifespan of the energy bank is below a threshold lifespan, wherein, the visual message and the alarm is indicative of preventive or corrective action to be performed by the operator at the energy bank.

5. The method as claimed in claim 1, wherein the monitoring data is received from the APFC and wherein estimating local insights associated with component failure in the APFC comprises:

monitoring, by the communication gateway, deviation of a power factor of the APFC from a predefined threshold;

continuously generating, by the communication gateway, a log report including monitoring data associated with power factor, APFC Controller's relay position, and corresponding time instants, in response to the monitored deviation of the power factor of the APFC from the predefined threshold;

monitoring, by the communication gateway, a time interval in which the power factor for the APFC is improved after the relay in the APFC is activated in response to a deviation of the power factor from the predefined threshold; and identifying, by the communication gateway, a number of instances when the time interval in which the power factor for the APFC is improved is greater that a predefined time interval; and predicting, by the communication gateway, occurrence of a failure in one of a contactor, a fuse, and a capacitor in the APFC, based on the monitored deviation of the power factor, the log report, and the number of instances.

6. The method as claimed in claim 5, wherein estimating the global insights comprises:

validating the local insights associated with predicted occurrence of the failure in one of the contactor, the fuse, and the capacitor in the APFC, based on predictive analytics performed at the server using the monitoring data and the local insights.

7. The method as claimed in claim 1, wherein estimating global insights associated with harmonic spectrum comprises:

predicting, by the server, a harmonic spectrum of the power distribution grid, based on the monitoring data and local insights associated with harmonic spectrum in each of the plurality of APFC; and estimating, by the server, occurrence of harmonic resonance in the power distribution grid, based on the monitoring data and predicted harmonic pollution for the plurality of APFC in the power distribution grid.

8. The method as claimed in claim 1, wherein the monitoring data is received from the APFC, amongst a plurality of APFCs, wherein estimating global insights associated with predictive network loss and payback comprises:

receiving, by the server, the monitoring data and local insights associated with predictive network loss and payback from each of the plurality of APFCs; and estimating, by the server, predictive network loss and payback of the power distribution grid based on the monitoring data and local insights associated with predictive network loss and payback.

9. A system for power quality monitoring in a power distribution grid, wherein the power distribution grid includes a plurality of nodes, wherein each of the plurality of nodes comprises one of an automatic power factor controller (APFC) and an Intelligent electronic devices (IED), the system comprising:

a plurality of communication gateways, each of the plurality of nodes being coupled to a corresponding communication gateway from the plurality of communication gateways; and a server coupled to the plurality of communication gateways;

wherein each of the plurality of communication gateways comprises:

a first processor;

a local data analytics module coupled to the first processor to:

receive monitoring data from a node, wherein the monitoring data is indicative of measured and calculated values of parameters, logs, and events generated at the node, wherein the monitoring data is received from the APFC; and estimate, by predictive analytics, local insights for power quality monitoring, based on the monitoring data, the local insights being indicative of health of electrical components at the node, wherein estimating the local insights comprises estimating the local insights associated with harmonic spectrum, wherein estimating the local insights associated with the harmonic spectrum comprises predicting, by the communication gateway, harmonic pollution in the APFC, based on the monitoring data associated with voltage, current, total harmonic distortion, power factor, higher order harmonics, and lower order harmonics in the APFC; and a transmission module coupled to the first processor to:
  transmit the monitoring data and the local insights associated with each of the plurality of nodes to the server; and wherein the server comprises:
  a second processor;
  a global data analytics module coupled to the second processor to:
    estimate, using predictive analytics, global insights for power quality monitoring, based on the monitoring data and the local insights, the global insights being indicative of health of electrical components and power quality of the power distribution grid; and
    generate an indication to an operator, based on the estimated local insights, global insights and the monitoring data, to carry out preventive or corrective action for maintaining the power quality in the power distribution grid.

* * * * *